United States Patent
Serbu et al.

(10) Patent No.: US 9,630,461 B2
(45) Date of Patent: Apr. 25, 2017

(54) PRESSURE SYSTEM FOR A TIRE ASSEMBLY OF A VEHICLE

(71) Applicant: GM GLOBAL TECHNOLOGY OPERATIONS LLC, Detroit, MI (US)

(72) Inventors: Liviu Serbu, Woodbridge (CA); Joseph K. Moore, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 14/317,532

(22) Filed: Jun. 27, 2014

(65) Prior Publication Data
US 2015/0375581 A1   Dec. 31, 2015

(51) Int. Cl.
*B60C 23/10*   (2006.01)
*B60C 23/04*   (2006.01)

(52) U.S. Cl.
CPC .............................. *B60C 23/0494* (2013.01)

(58) Field of Classification Search
CPC ....... B60C 23/004; B60C 23/04; B60C 23/00; B60C 23/02; B60C 23/002; B60C 23/001; B60C 23/10; B60C 23/16; B60C 23/20; B60C 23/0494
See application file for complete search history.

(56) References Cited

U.S. PATENT DOCUMENTS

| 4,754,792 | A  | * | 7/1988  | Braun     | B60C 23/003 |
|           |    |   |         |           | 137/224     |
| 5,452,753 | A  | * | 9/1995  | Olney     | B60C 23/004 |
|           |    |   |         |           | 152/417     |
| 5,505,080 | A  | * | 4/1996  | McGhee    | B60C 23/12  |
|           |    |   |         |           | 116/34 R    |
| 6,550,511 | B2 | * | 4/2003  | Nienhaus  | B60C 23/003 |
|           |    |   |         |           | 152/415     |
| 6,601,625 | B2 | * | 8/2003  | Rheinhardt| B60C 23/004 |
|           |    |   |         |           | 152/415     |
| 6,744,356 | B2 | * | 6/2004  | Hamilton  | B60C 23/041 |
|           |    |   |         |           | 152/418     |
| 6,993,962 | B1 | * | 2/2006  | Ko        | B60C 23/0408|
|           |    |   |         |           | 73/146.5    |
| 7,237,590 | B2 | * | 7/2007  | Loewe     | B60C 23/004 |
|           |    |   |         |           | 152/418     |
| 7,444,859 | B2 | * | 11/2008 | Filippi   | B60C 23/004 |
|           |    |   |         |           | 340/442     |

(Continued)

FOREIGN PATENT DOCUMENTS

CN   85104271 A   12/1986

*Primary Examiner* — James M Dolak
(74) *Attorney, Agent, or Firm* — Quinn IP Law (57) ABSTRACT

A tire assembly includes a reservoir, a tire, and a pressure module. The pressure module includes a first valve, a second valve, and a control unit. The first valve selectively directs air from the reservoir to the interior cavity. The second valve directs air from the interior cavity of the tire to the atmosphere. The control unit is configured to selectively send a first control signal to the first valve such that the first valve cycles from a first position, at which air is prevented from flowing from the reservoir to the interior cavity, to a second position, at which air is allowed to flow from the reservoir to the interior cavity of the tire. The control unit is configured to selectively send another first control signal to the first valve such that the first valve cycles from the second position to the first position.

18 Claims, 8 Drawing Sheets

(56) References Cited

U.S. PATENT DOCUMENTS

| | | | | |
|---|---|---|---|---|
| 7,706,930 | B2* | 4/2010 | Corniot | B60S 5/046 |
| | | | | 340/442 |
| 7,911,332 | B2* | 3/2011 | Caretta | B60C 23/004 |
| | | | | 152/331.1 |
| 8,052,400 | B2* | 11/2011 | Isono | B60C 23/003 |
| | | | | 152/417 |
| 8,307,868 | B2* | 11/2012 | Medley | B60C 23/003 |
| | | | | 152/415 |
| 8,742,912 | B2* | 6/2014 | Blanchard | B60C 23/041 |
| | | | | 340/442 |
| 9,434,218 | B2* | 9/2016 | Root | B60C 23/041 |
| 9,446,637 | B2* | 9/2016 | Knapke | B60C 23/003 |
| 9,446,638 | B2* | 9/2016 | Tanno | B60B 1/12 |
| 9,452,646 | B2* | 9/2016 | Kanenari | B60C 23/04 |
| 9,481,214 | B2* | 11/2016 | Tanno | B60B 1/12 |
| 2007/0240803 | A1* | 10/2007 | Marin-Martinod | B60C 23/004 |
| | | | | 152/418 |

* cited by examiner

PRESSURE SYSTEM FOR A TIRE ASSEMBLY OF A VEHICLE

TECHNICAL FIELD

The present disclosure is related to a pressure system for a tire assembly of a vehicle.

BACKGROUND

Certain vehicles have tire pressure monitoring systems. Each tire of the vehicle has a pressure, which is communicated as pressure data to an operator of the vehicle, via a vehicle controller. A pressure sensor and other associated circuitry may be specific to each wheel and the tire mounted thereon. If the communication to the operator indicates that the tire pressure is too low or too high, the operator is required to manually adjust the temperature using an air compressor, a tire gauge, and the like.

SUMMARY

One aspect of the disclosure provides a pressure module for a tire assembly having a reservoir and a tire defining an interior cavity. The pressure module includes a first valve, a second valve, and a control unit. The first valve is configured to selectively direct air from the reservoir to the interior cavity of the tire. The second valve is configured to direct air from the interior cavity of the tire to the atmosphere. The control unit is in operative communication with the first valve. The control unit is configured to selectively send a first control signal to the first valve such that the first valve cycles from a first position to a second position. In the first position, air is prevented from flowing from the reservoir to the interior cavity. In the second position, air is allowed to flow from the reservoir to the interior cavity of the tire. Likewise, the control unit is configured to selectively send another first control signal to the first valve, such that the first valve cycles from the second position to the first position.

In another aspect of the disclosure, a tire assembly for a vehicle is provided. The tire assembly includes a reservoir, a tire, and a pressure module. The reservoir is configured for holding pressurized air therein. The tire defines an interior cavity that is configured for holding pressurized air therein. The pressure module is in selective fluid communication with each of the reservoir and the tire. The pressure module includes a first valve, a second valve, and a control unit. The first valve is configured to selectively direct air from the reservoir to the interior cavity of the tire. The second valve is configured to direct air from the interior cavity of the tire to the atmosphere. The control unit is in operative communication with the first valve. The control unit is configured to selectively send a first control signal to the first valve such that the first valve cycles from a first position to a second position. In the first position, air is prevented from flowing from the reservoir to the interior cavity. In the second position, air is allowed to flow from the reservoir to the interior cavity of the tire. Likewise, the control unit is configured to selectively send another first control signal to the first valve, such that the first valve cycles from the second position to the first position.

In yet another aspect of the disclosure, a vehicle includes a vehicle controller and a tire assembly. The tire assembly is in operative communication with the vehicle controller. The tire assembly includes a reservoir, a tire, and a pressure module. The reservoir is configured for holding pressurized air therein. The tire defines an interior cavity that is configured for holding pressurized air therein. The pressure module is in selective fluid communication with each of the reservoir and the tire. The pressure module includes a first valve, a second valve, and a control unit. The first valve is configured to selectively direct air from the reservoir to the interior cavity of the tire. The second valve is configured to direct air from the interior cavity of the tire to the atmosphere. The control unit is in operative communication with the first valve. The control unit is configured to selectively send a first control signal to the first valve such that the first valve cycles from a first position to a second position. In the first position, air is prevented from flowing from the reservoir to the interior cavity. In the second position, air is allowed to flow from the reservoir to the interior cavity of the tire. Likewise, the control unit is configured to selectively send another first control signal to the first valve, such that the first valve cycles from the second position to the first position.

The above features and advantages and other features and advantages of the present disclosure are readily apparent from the following detailed description of the best modes for carrying out the disclosure when taken in connection with the accompanying drawings.

DETAILED DESCRIPTION

Those having ordinary skill in the art will recognize that terms such as "above," "below," "upward," "downward,"

"top," "bottom," etc., are used descriptively for the figures, and do not represent limitations on the scope of the disclosure, as defined by the appended claims.

Figure 1:
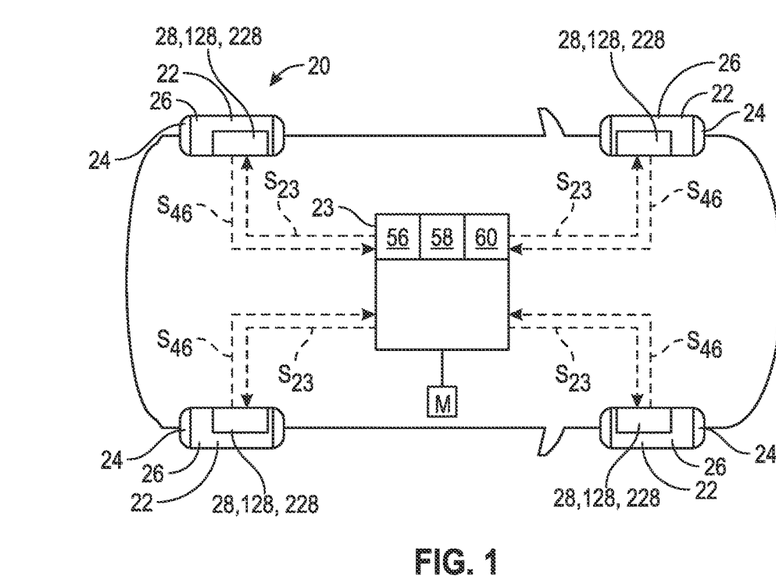
FIG. 1 is a schematic block diagram of a vehicle having four tire assemblies and a vehicle controller in communication with each of the tires assemblies.
Figure 2:
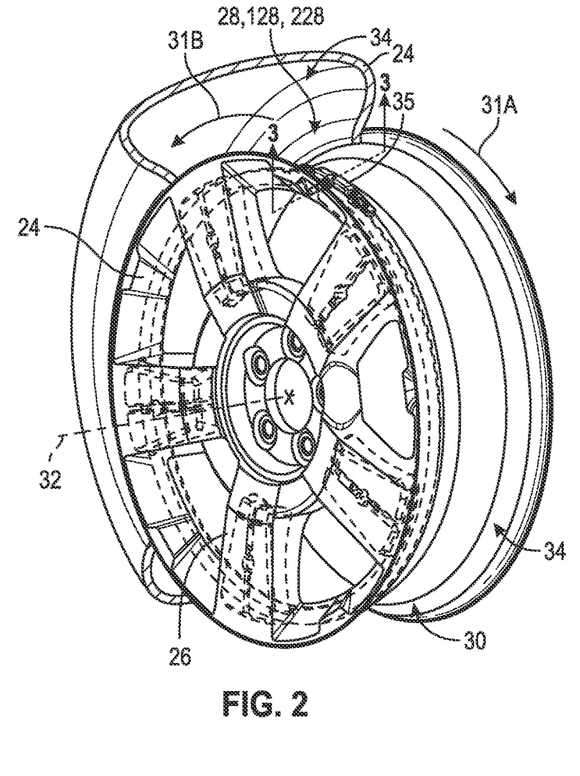
FIG. 2 is a schematic partial cross-sectional perspective view of the tire assembly illustrating a pressure system attached to a wheel of the entire assembly.

Referring to the Figures, wherein like numerals indicate like parts throughout the several views, a vehicle is generally shown at 20 in FIG. 1. The vehicle 20 includes four tire assemblies 22, each in operative communication with a vehicle controller 23. It should be appreciated that the vehicle 20 is not limited to having four tire assemblies 22, as the vehicle 20 may include any number of tire assemblies 22. With reference to FIG. 2, each tire assembly 22 includes a tire 24, a wheel 26, and a pressure system 28. The tire 24 is attached to the wheel 26. The tire 24 may include any suitable type, style size, and/or construction of tire 24, including but not limited to a radial tire or a bias ply tire.

With reference to FIG. 2, the wheel 26 is circular and includes a perimeter 30 that surrounds an axis of rotation 32 of the tire assembly 22. The tire assembly 22 is configured to rotate in a first direction 31A and a second direction 31B, opposite the first direction 31A. The tire 24 is mounted to the wheel 26 at the perimeter 30 such that the perimeter 30 and the tire 24 cooperate to define an interior cavity 34 of the tire assembly 22. The interior cavity 34 of the tire 24 is known as the contained air volume of the tire assembly 22. When the tire 24 is mounted to the wheel 26, the interior cavity 34 is pressurized with gas, such as air, to inflate the tire assembly 22, as is well known.

Figure 4A:
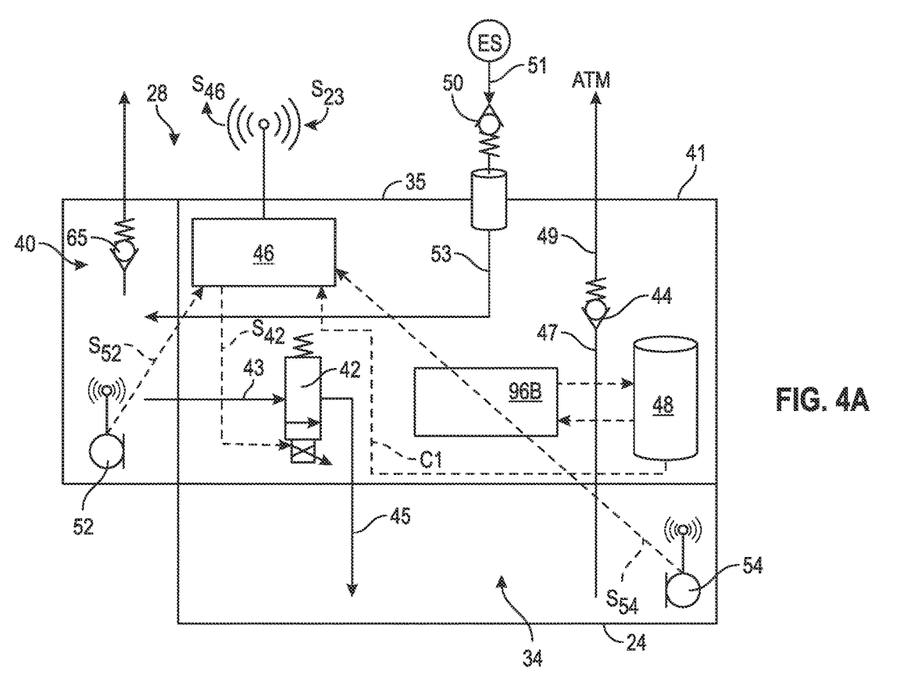
FIG. 4A is a schematic block diagram of the pressure system for the tire assembly.
Figure 4B:
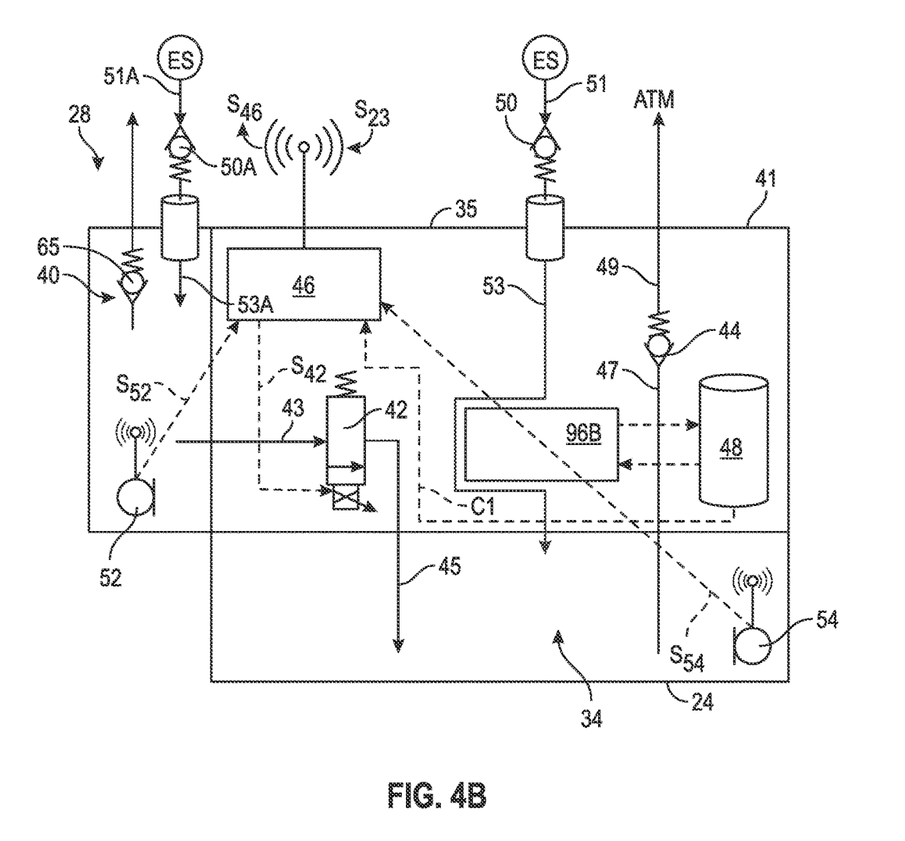
FIG. 4B is a schematic block diagram of another pressure system for the tire assembly.
Figure 5:
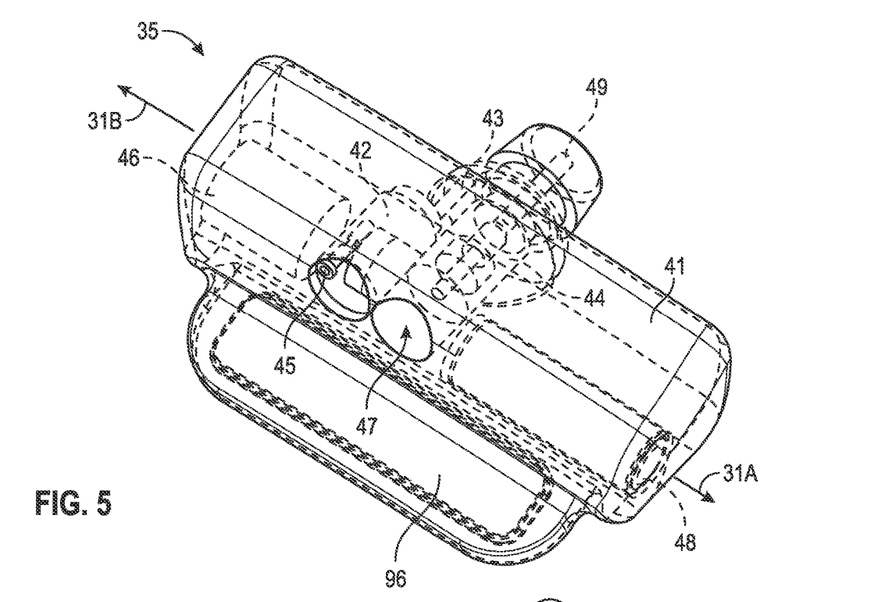
FIG. 5 is a schematic perspective view of the pressure system of FIG. 4A.

Referring now to FIGS. 2, 4A, 4B, and 5, the pressure system 28 is in selective communication with the interior cavity 34 of the tire 24. More specifically, the pressure system 28 includes a pressure module 35 and a reservoir 40. With reference to FIG. 5, the pressure module 35 includes a housing 41, a first valve 42, a second valve 44, a control unit 46, and an energy storage device 48. The first valve 42, the second valve 44, the control unit 46, and the energy storage device 48 are disposed within the housing 41.

Referring to FIGS. 4A, 4B, and 5, the first valve 42 is a controlled check-valve configured for selectively directing air from the reservoir 40 to the interior cavity 34 of the tire 24. More specifically, the first valve 42 includes a first inlet port 43 and a first outlet port 45. The first inlet port 43 is in fluid communication with the reservoir 40 and the first outlet port 45 is in fluid communication with the interior cavity 34 of the tire 24.

Figure 10:
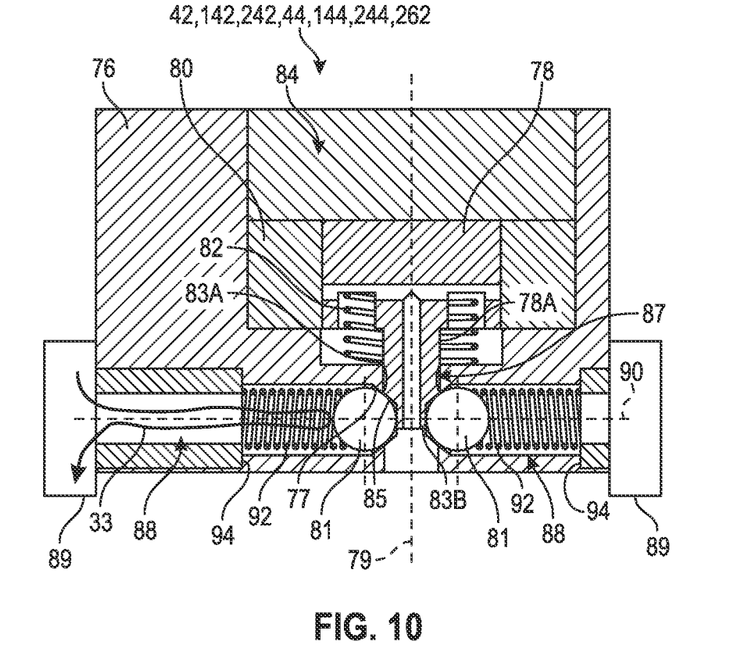
FIG. 10 is a cross-sectional view of a controlled check-valve in a closed position to prevent air from flowing therethrough.
Figure 11:
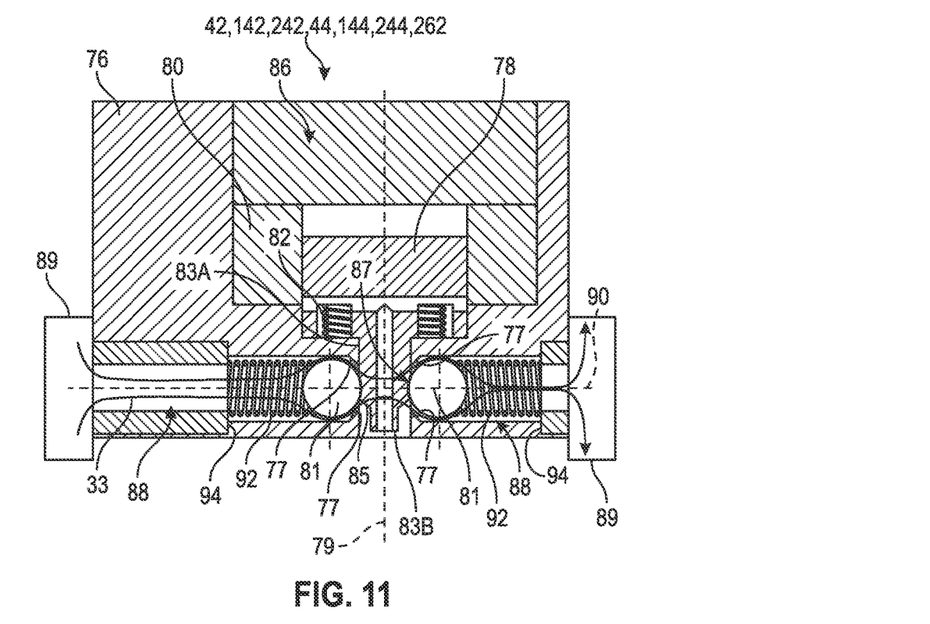
FIG. 11 is a cross-sectional view of the controlled check-valve of FIG. 10 in an open position to allow air to flow therethrough.
Figures 12, 13:
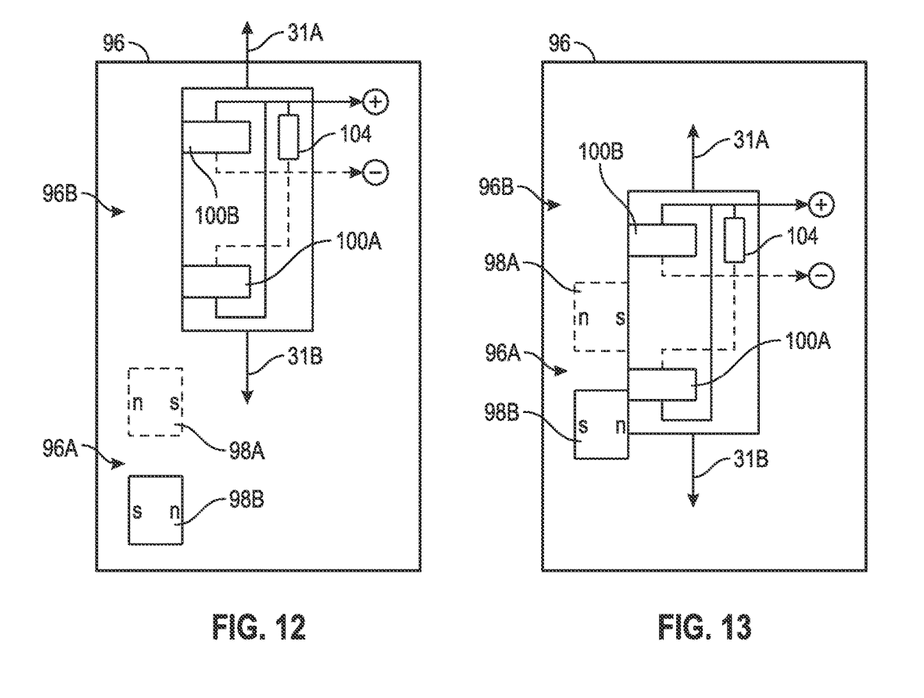
FIGS. 12-15 are schematic diagrammatic views of the first charging module in different locations, relative to the second charging module, is the first charging module rotates with the tire assembly, relative to the brake caliper.
Figure 14:
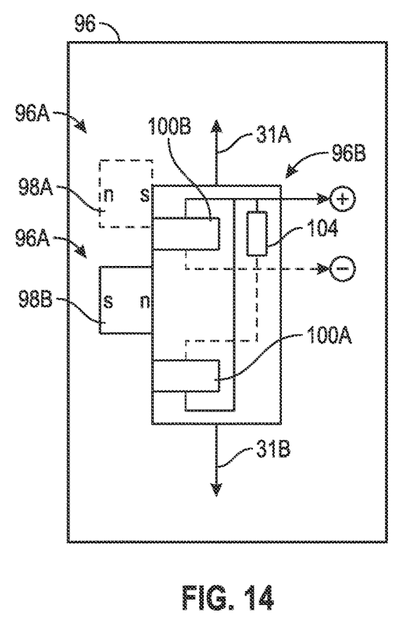
Figure 15:
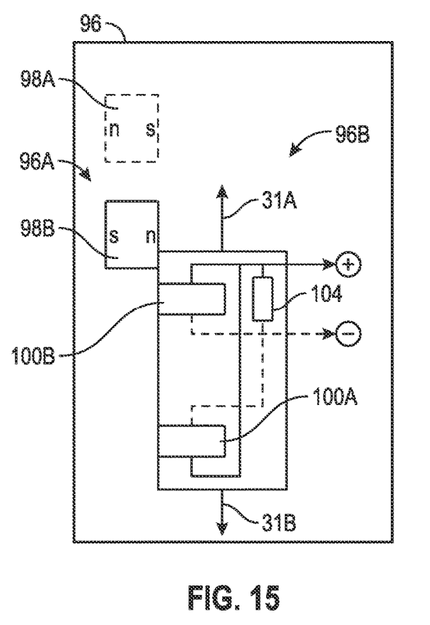

The control unit 46 is in operative communication with the first valve 42. The control unit 46 is configured to selectively send a first control signal (at arrow $S_{42}$) to the first valve 42 such that the first valve 42 cycles from one of a closed position 84 (as shown in FIG. 10) and an open position 86 (as shown in FIG. 11) to the other one of the closed position 84 and the open position. In the open position 86, air is allowed to flow from the reservoir 40 to the interior cavity 34 of the tire 24. This level of air occurs due to the air in the reservoir 40 being at a higher pressure than the pressure in the interior cavity 34 of the tire 24. Likewise, in the closed position 84, air is prevented from flowing from the reservoir 40 to the interior cavity 34 of the tire 24.

The energy storage device 48 may be a battery in operative communication with the control unit 46. The energy storage device 48 is configured to provide electrical current (arrow C1) to the control unit 46. In turn, the control unit 46 is configured to send the first control signal $S_{42}$ to the first valve 42. Therefore, the first control signal $S_{42}$ may also be an electrical current.

The second valve 44 is configured to direct air from the interior cavity 34 of the tire 24 to the atmosphere ATM. More specifically, the second valve 44 includes a second inlet port 47 and a second outlet port 49. The second inlet port 47 is in fluid communication with the interior cavity 34 of the tire 24 and the second outlet port 49 is in fluid communication with the atmosphere ATM. With continued reference to the embodiment illustrated in FIGS. 4A and 4B, the second valve 44 is a check-valve configured to automatically allow air to flow from the interior cavity 34 of the tire 24 to atmosphere ATM, in the event pressure within the interior cavity 34 of the tire 24 is greater than a predefined threshold pressure. As such, the second valve 44 is configured to act as an automatic pressure relief valve to the interior cavity 34 of the tire 24.

Referring to FIGS. 10 and 11, the first valve 42 is illustrated. The first valve 42 includes housing 76, a plunger 78, an electric coil 80, a pair of ball bearings 81, a first biasing member 82, and a pair of second biasing members 92. The plunger 78, the electric coil 80, the pair of ball bearings 81, the first biasing member 82, and the pair of second biasing members 92 are disposed inside the housing 76. The electric coil 80 is distributed radially to define an electromagnet. The electric coil 80 is operatively connected to an actuating source, which may be, for example, the control unit 46. In turn, the control unit 46 is connected to the energy storage device 48, through which current may be selectively provided to the electric coil 80 so as to create a magnetic field.

The plunger 78 is axially disposed within the electric coil 80, such that the coil 80 radially surrounds the plunger 78. The plunger 78 is configured to move along a first axis 79, relative to the electric coil 80, from the first position 84 (closed position) to the second position 86 (open position) in response to the magnetic field created by current being provided to the coil 80.

The first biasing member 82 may be, for example, a compression spring, configured to bias the plunger 78 into the first position 84 from the second position 86. When the plunger 78 is in the second position 86, the first biasing member 82 is compressed to thereby exert a return force on the plunger 78.

The plunger 78 includes a shaft 78A, extending axially, along the first axis 79. The shaft includes a first shaft portion 83A defining a groove 87 surrounding the first axis 79. The shaft 78A also includes a second shaft portion 83B extending axially from the first shaft portion 83A. A beveled surface 85 interconnects the first shaft portion 83A and the second shaft portion 83B, such that the second shaft portion 83B tapers from the first shaft portion 83.

The housing 76 defines a conduit 88 extending along a second axis 90, in generally perpendicular relationship to the first axis 79. The housing 76 includes a pair of conical surfaces 77 extending radially inward, toward the first axis 79. The shaft 78A of the plunger extends along the first axis 79, into the conduit 88, such that the shaft 78A is disposed between the pair of conical surfaces 77. The ball bearings 81 are operatively disposed in the conduit 88, such that one of the conical surfaces 77 is disposed between a respective ball bearing 81 and the shaft 78A. More specifically, one of the ball bearings 81 is configured to selectively seal against the respective conical surface 77. The second biasing members 92 are operatively disposed between a respective ball bearing 81 and a respective wall 94 of the housing 76. As such, the second biasing members 92 exert a return force on the respective ball bearing 81 to continuously bias the respective ball bearing 81 toward the conical surface 77 (and the shaft 78A).

When the first valve 42 is in the first position 84, as shown in FIG. 10, the plunger 78 is retracted along the first axis 79 such that the ball bearings 81 are seated against the respective conical surface 77 to provide a seal to prevent air 33 from travelling through the conduit 88. When seated against the conical surfaces 77, each ball bearing 81 effectively acts as a check-valve against air. As such, there may be no air communication between the reservoir 40 and the interior cavity 34 of the tire 24 when the first valve 42 is in the first position 84.

However, referring to FIG. 11, when the coil 80 is energized, the plunger 78 moves along the first axis 79 to the second position 86. Movement of the plunger 78 causes the ball bearings 81 to ride away from one another, along the beveled surface 85 and to compress the respective second biasing member 92 until each ball bearing 81 is seated within the groove 87. Once the ball bearings 81 are seated within the groove 87 in the first shaft portion 83A, air 33 is allowed to pass through the conduit 88 from the reservoir 42 the interior cavity 34 of the tire 24. More specifically, the air will travel from the higher air pressure of the reservoir 40 two the lower air pressure of the interior cavity 34 of the tire 24. As such, the first valve 42 may function as a controlled release valve. Further, once the plunger 78 is in the second position 86 with the ball bearings 81 seated within the groove 87, the coil 80 may be de-energized, since a combination of the return force generated by each of the second biasing members 92 and the ball bearings 81 being seated within the groove 87 is sufficient to maintain the first valve 42 in the second position 86.

With continued reference to FIGS. 10 and 11, a filter 89 may be operatively disposed along, or at an entry/exit of the conduit 88. The filters 89 prevent debris from entering or exiting the valve 42.

The first valve 42 may function as a double check valve. More specifically, in certain scenarios, the first valve 42 may be configured such that when air pressure in the tire drops at a rate which is greater than an expected tire pressure decay, algorithms, resident within the vehicle controller 23, may assess a rate of pressure decay, a pressure reserve in the reservoir of 40 and a time necessary to compensate for this type of pressure loss. Based on the results of the assessment, the vehicle controller 23 may transmit a message M corresponding to a time or distance by which the tire 24 should be repressurized. In one embodiment, the message M may indicate for the driver to step driving the vehicle 20 within a specified time or distance. In this embodiment, the first valve 42 maybe controlled by the vehicle controller 23 in its function to help the regulation of the tire pressure. In another embodiment, when the air pressure within the cavity 34 of the tire 24 rises suddenly, the ball bearing 81 disposed between the shaft 78A and the reservoir 40, is configured to function as a check valve for the reservoir 40 to prevent air from escaping from the reservoir 40.

In another embodiment the first valve 42 may be configured to preserve air pressure within the interior cavity 34 of the tire 24 in the event the reservoir 40 develops a leak. As such, the ball bearing 81 disposed between the shaft 78A and the interior cavity 34 of the tire 24 is configured to function as a check valve for the tire 24. The vehicle controller 23 may be configured to transmit a message M relating to the leak in the reservoir 40.

Once a determination is made to cycle the first valve 42 to the second position 86, the coil 80 is reenergized via the control unit 46, with reversed polarity. The pair of ball bearings 81 are provided to act in opposition to one another so as to provide a balance of return forces acting in opposition to one another on the shaft 78A. As such, the energy required to close or open the first valve 42 is not wasted against friction forces during translation of the plunger 78.

Referring again to FIGS. 4A and 4B, the pressure module 35 may also include a third valve 50. The third valve 50 includes a third inlet port 51 and a third outlet port 53. The third inlet port 51 is in selective fluid communication with an external source ES. Referring specifically to FIG. 4A, the third outlet port 53 is in fluid communication with the reservoir 40. Referring specifically to FIG. 4B, the third outlet port 53 is in fluid communication with the interior cavity 34 of the tire 24. Referring again to FIGS. 4A and 4B, the third valve 50 may be a one-way valve such that air is prevented from escaping from the reservoir 40 and the interior cavity 34 of the tire 24, respectively, via the third valve 50. Referring again to FIG. 4A, the third valve 50 is configured to allow pressurized air to be provided into the reservoir 40 from an external source ES, when the pressurized air is greater than a predefined threshold pressure, such as an air compressor, a pump, and the like. Referring now to FIG. 4B, the third valve 50 is configured to allow pressurized air to be provided into the interior cavity 34 of the tire 24 from the external source ES, when the pressurized air is greater than a predefined threshold pressure. With reference to FIGS. 4A and 4B, it should be appreciated, however, that the third valve 50 is not required to be contained within the housing 41, but may also be configured as a component, such as a valve stem, which is separate from the pressure module 35.

Referring specifically to FIG. 4B, the pressure module 35 may also include a filler valve 50A. The filler valve 50A includes a filler inlet port 51A and a filler outlet port 53A. The filler inlet port 51A is in selective fluid communication with an external source ES and the filler outlet port 53A is in fluid communication with the reservoir 40. The filler valve 50A may be a one-way valve such that air is prevented from escaping from the reservoir 40, via the filler valve 50A. The filler valve 50A is configured to allow pressurized air to be provided into the reservoir 40 from an external source ES, when the pressurized air is greater than a predefined threshold pressure.

Referring again to FIGS. 4A and 4B, a first pressure gauge 52 may be in operative communication with the reservoir 40. The first pressure gauge 52 may be configured to monitor the pressure and the temperature of the air within the reservoir 40. The monitored pressure and temperature of air within the reservoir 40 may be transmitted from the first pressure gauge 52 to the control unit 46 (at arrow $S_{52}$). The first gauge 52 may transmit the pressure and temperature wirelessly. However, it should be appreciated that the monitored pressure and temperature of air may also be transmitted via a wired transmission.

A second pressure gauge 54 may be in operative communication with the interior cavity 34 of the tire 24. The second pressure gauge 54 may be configured to monitor the pressure and the temperature of air within the interior cavity 34 of the tire 24. The monitored pressure and temperature of air within the interior cavity 34 of the tire 24 may be transmitted from the second pressure gauge 54 to the control unit 46 (at arrow $S_{54}$). The second gauge 54 may transmit the pressure wirelessly. However, it should be appreciated that the monitored pressure of air may also be transmitted via a wired transmission.

With reference to FIGS. 1, 4A, and 4B, the control unit 46 is configured to transmit the pressures, corresponding to the pressure signals $S_{52}$ and $S_{54}$, to the vehicle controller 23 (at arrow $S_{46}$). In turn, the vehicle controller 23 is configured to determine whether the pressures within the reservoir 40 and the interior cavity 34 of the tire 24 are each at a desired pressure. The vehicle controller 23 may be configured to employ any of a number of computer operating systems and generally include computer-executable instructions, where the instructions may be executable by one or more computers. Computer-executable instructions may be compiled or interpreted from computer programs created using a variety of well-known programming languages and/or technologies, including, without limitation, and either alone or in combination, Java™, C, C++, Visual Basic, Java Script, Perl, etc.

The physical hardware embodying the vehicle controller 23 may include one or more digital computers having a processor 56 and a memory 58, e.g., a read only memory (ROM), random access memory (RAM), electrically-programmable read only memory (EPROM), high speed clock, analog to digital (A/D) and digital to analog (D/A) circuitry, and input/output circuitry and devices (I/O) including one or more transceivers 60 for receiving and transmitting any required signals in the executing of a method 100, as well as appropriate signal conditioning and buffer circuitry. Any computer-code resident in the vehicle controller 23 or accessible thereby, including an algorithm 100, can be stored in the memory 58 and executed via the processor(s) 56 to provide the functionality set forth below.

The vehicle controller 23 of FIG. 1 may be configured as a single or a distributed control device. The vehicle controller 23 may be in wireless communication with, or electrically connected to, each of the pressure systems 28 via suitable control channels, e.g., a controller area network (CAN) or serial bus, including for instance any required transfer conductors, whether hard-wired or wireless, sufficient for transmitting and receiving necessary control signals for monitoring and controlling the pressure system 28 of each tire assembly 22 of the vehicle 20.

With continued reference to FIGS. 1, 4A, and 4B, if the vehicle controller 23 determines that the pressure within the reservoir 40 is too low, the vehicle controller 23 may transmit a message M to alert an operator of the vehicle 20 that the pressure within the reservoir 40 is too low. If the vehicle controller 23 determines the pressure within the reservoir 40 is too high or the pressure within the interior cavity 34 of the tire 24 is too low, the vehicle controller 23 may also transmit a signal (arrow $S_{23}$) to the control unit 46 of a respective pressure system 28 of the respective tire assembly 22. In response to receiving the signal (arrow $S_{23}$), the control unit 46 is configured to transmit the first control signal $S_{42}$ to cycle the first valve 42 between the open position 84 and closed position 86 until pressure within the reservoir 40 is diminished to a desired pressure and/or the pressure within the interior cavity 34 of the tire 24 achieves a desired pressure.

Figure 6:
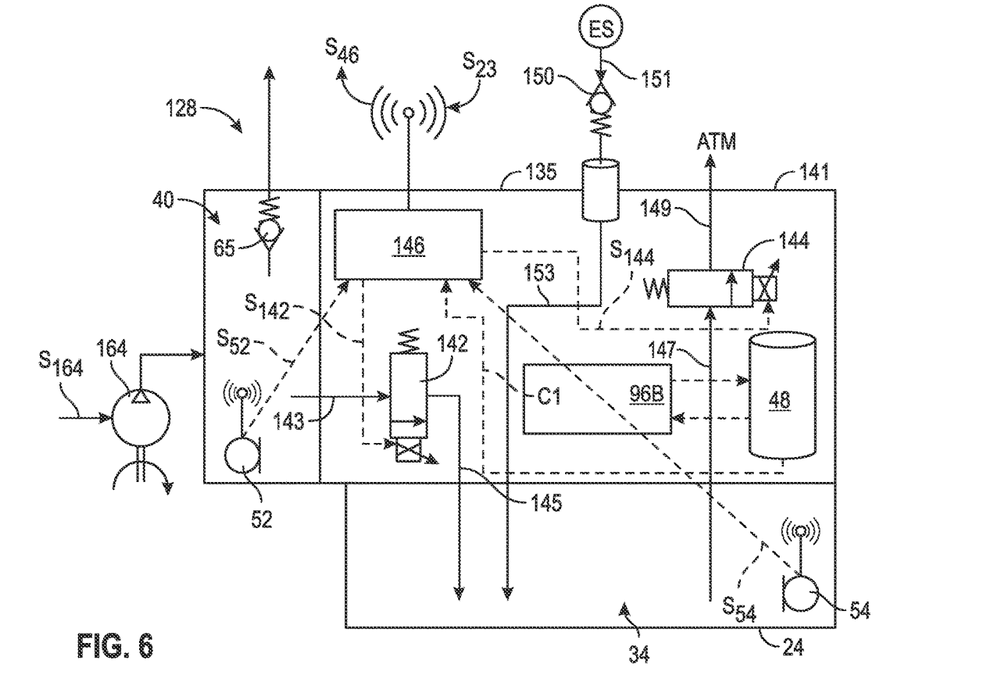
FIG. 6 is a schematic block diagram of another pressure system for the tire assembly.
Figure 7:
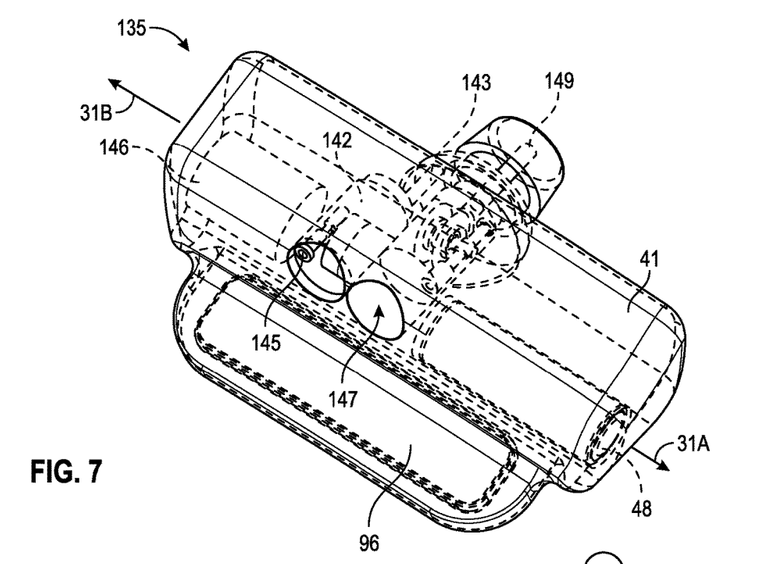
FIG. 7 is a schematic perspective view of the pressure system of FIG. 6.

Referring now to FIGS. 6 and 7, another embodiment of the pressure system 128 is illustrated. The pressure system 128 includes a pressure module 135 and a reservoir 40. With reference to FIG. 5, the pressure module 135 includes a housing 141, a first valve 142, a second valve 144, a control unit 46, and an energy storage device 48. The first valve 142, the second valve 144, the control unit 146, and the energy storage device 48 are disposed within the housing 141.

With continued reference to FIGS. 6 and 7, the first valve 142 is a controlled check-valve, configured for selectively directing air from the reservoir 40 to the interior cavity 34 of the tire 24. The controlled check-valve may be the same type of controlled check-valve already described above with respect to FIGS. 10 and 11. More specifically, the first valve 142 includes a first inlet port 143 and a first outlet port 145. The first inlet port 143 is in fluid communication with the reservoir 40 and the first outlet port 145 is in fluid communication with the interior cavity 34 of the tire 24.

The second valve 144 may be a controlled check-valve configured to selectively direct air from the interior cavity 34 of the tire 24 to the atmosphere ATM. The controlled check-valve maybe of the same type of controlled check-valve already described above respect to FIGS. 10 and 11. More specifically, the second valve 144 includes a second inlet port 147 and a second outlet port 149. The second inlet port 147 is in fluid communication with the interior cavity 34 of the tire 24 and the second outlet port 149 is in fluid communication with atmosphere ATM.

The control unit 146 is in operative communication with the first valve 142 and the second valve 144. The control unit 146 is configured to selectively send a first control signal (arrow $S_{142}$) to the first valve 142 such that the first valve 142 cycles from one of the closed position 84 to the open position 86 to the other one of the closed position 84 and the open position 86. In the open position 86, air is allowed to flow from the reservoir 40 to the interior cavity 34 of the tire 24. Likewise, in the closed position 84, air is prevented from flowing from the reservoir 40 to the interior cavity 34 of the tire 24.

Similarly, the control unit 146 is configured to selectively send a second control signal (arrow $S_{144}$) to the second valve 144 such that the second valve 144 cycles from the closed position 84 to the open position 86 to allow air to flow from the interior cavity 34 of the tire 24 to atmosphere ATM. Likewise, the control unit 146 is configured to selectively send another second control signal (arrow $S_{144}$) to the second valve 144 such that the second valve 144 cycles from the open position 86 to the closed position 84 to prevent air from flowing from the interior cavity 34 of the tire 24 to atmosphere ATM.

Referring again to FIG. 6, the pressure module 135 may also include a third valve 150 configured to allow pressurized air to be provided into the interior cavity 34 of the tire 24 from an external source ES. The third valve 150 includes a third inlet port 151 and a third outlet port 153. The third inlet port 151 is in selective fluid communication with the external source ES and the third outlet port 153 is in fluid communication with the cavity 34 of the tire 24. The third valve 150 may be may be a one-way valve that is configured to automatically open under a controlled pressure of air to allow air to flow in one direction through the third valve 150, while preventing air from escaping from the interior cavity 34 of the tire 24 via the third valve 150. It should be appreciated that the third valve 150 may optionally be located in a component, such as a valve stem, external to the pressure module 135.

With continued reference to FIG. 6, the first pressure gauge 52 may be in operative communication with the reservoir 40. The first pressure gauge 52 may be configured to monitor the pressure and the temperature of the air within the reservoir 40. The monitored pressure and temperature of air within the reservoir 40 may be transmitted from the first pressure gauge 52 to the control unit 146 (arrow $S_{52}$). The first gauge 52 may transmit the pressure and temperature wirelessly. However, it should be appreciated that the monitored pressure and temperature of air may also be transmitted via a wired transmission.

The second pressure gauge 54 may be in operative communication with the interior cavity 34 of the tire 24. The second pressure gauge 54 may be configured to monitor the pressure of air within the interior cavity 34 of the tire 24. The monitored pressure of air within the interior cavity 34 of the tire 24 may be transmitted from the second pressure gauge 54 to the control unit 146 (at arrow $S_{54}$). The second gauge 54 may transmit the pressure wirelessly. However, it should be appreciated that the monitored pressure of air may also be transmitted via a wired transmission.

Referring again to FIGS. 1 and 6, if the vehicle controller 23 determines that the pressure within the reservoir 40 is too low, the vehicle controller 23 may transmit a signal (arrow $S_{164}$) to an air pump 164 to, in turn, fill the reservoir 40 with pressurized air. If the vehicle controller 23 determines the pressure within the reservoir 40 is at a prescribed value or the pressure within the interior cavity 34 of the tire 24 is too low, the vehicle controller 23 may transmit a signal (arrow $S_{23}$) to the control unit 146 of the respective pressure system 28. In response to receiving the signal (arrow $S_{23}$), the control unit 146 is configured to stop the air pump 164 or transmit the first control signal $S_{142}$ to cycle the first valve 142 from the closed position 84 in the open position 86, until pressure within the interior cavity 34 of the tire 24 achieves a desired pressure. As such, once a desired pressure is achieved, the control unit 146 transmits another first control signal $S_{142}$ to cycle the first valve 142 from the open position 86 to the closed position 84.

With continued reference to FIGS. 1 and 6, if the vehicle controller 23 determines that the pressure within the interior cavity 34 of the tire 24 is too high, the vehicle controller 23 may transmit a signal (arrow $S_{23}$) to the control unit 146 of the respective pressure system 28. In response to receiving the signal (arrow $S_{23}$), the control unit 146 is configured to transmit a second control signal (arrow $S_{144}$) to cycle the second valve 144 from the closed position 84 to the open position 86 until pressure within the interior cavity 34 of the tire 24 is diminished to a desired pressure. As such, once a desired pressure is achieved, the control unit 146 transmits another first control signal $S_{142}$ to cycle the first valve 142 from the open position 86 to the closed position 84.

Figure 8:
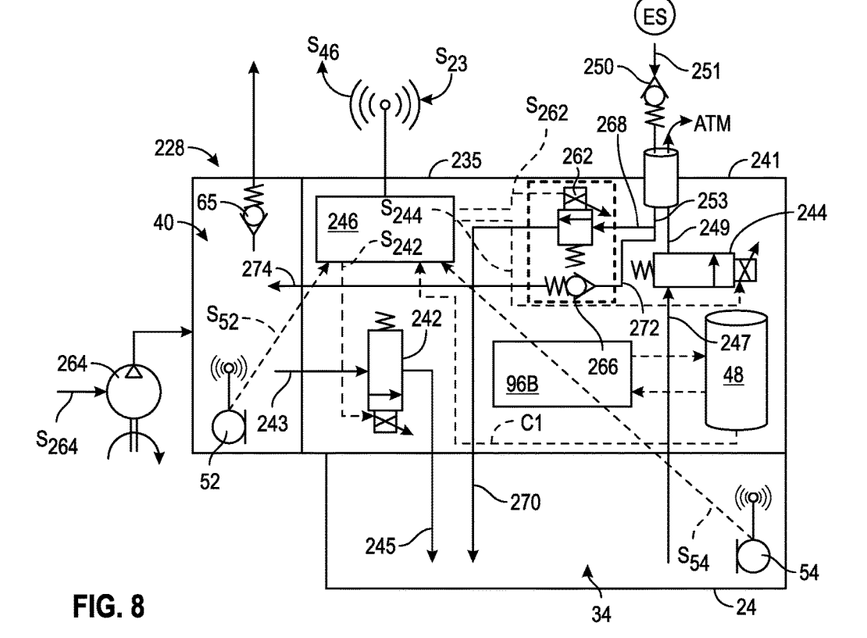
FIG. 8 is a schematic block diagram of yet another pressure system for the tire assembly.
Figure 9:
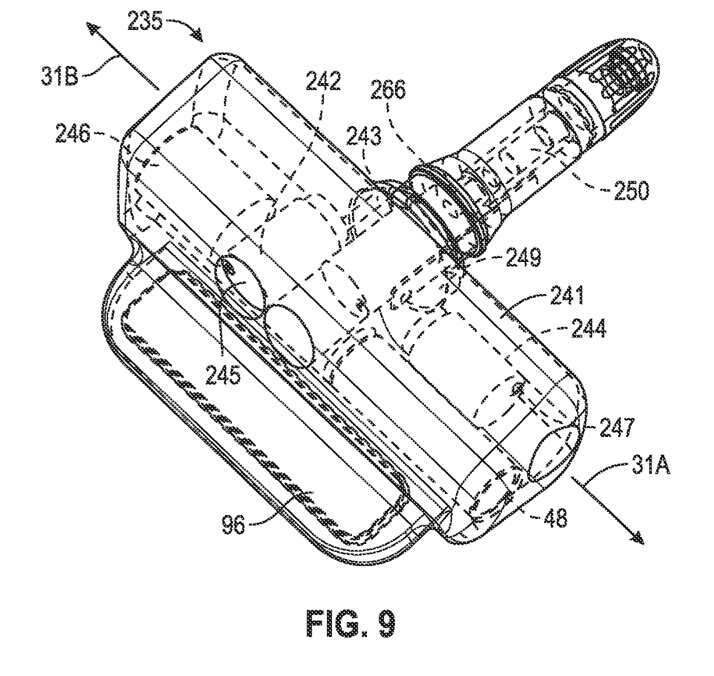
FIG. 9 is a schematic perspective view of the pressure system of FIG. 8.

Referring now to FIGS. 8 and 9, yet another embodiment of the pressure system 228 is illustrated. More specifically, the pressure system 228 includes a pressure module 235 and a reservoir 40. With reference to FIG. 9, the pressure module 235 includes a housing 241, a first valve 242, a second valve 244, a third valve 250, a fourth valve 262, is fifth valve 266, a control unit 246, and an energy storage device 48. The first valve 242, the second valve 244, the fourth valve, the control unit 246, and the energy storage device 48 are disposed within the housing 241.

Referring to FIGS. 8 and 9, the first valve 242 is configured for selectively directing air from the reservoir 40 to the interior cavity 34 of the tire 24. The first valve 242 may be a controlled check-valve, as already described above with respect to FIGS. 10 and 11. More specifically, the first valve 242 includes a first inlet port 243 and a first outlet port 245. The first inlet port 243 is in fluid communication with the reservoir 40 and the first outlet port 245 is in fluid communication with the interior cavity 34 of the tire 24.

The second valve 244 may also be a controlled check-valve, as already described above with respect to FIGS. 10 and 11. The second valve 244 is configured to selectively direct air from the interior cavity 34 of the tire 24 to the atmosphere ATM. More specifically, the second valve 244 includes a second inlet port 247 and a second outlet port 249. The second inlet port 247 is in fluid communication with the interior cavity 34 of the tire 24 and the second outlet port 249 is in fluid communication with atmosphere ATM. With continued reference to the embodiment illustrated in FIGS. 8 and 9, the second valve 244 is a check-valve configured to allow air to flow from the interior cavity 34 of the tire 24 to atmosphere ATM.

Referring again to FIGS. 8 and 9, the third valve 250 is configured to operate in combination with the fourth valve 262 and the fifth valve 266 to allow pressurized air to be provided from the external source ES into the interior cavity 34 of the tire 24, via the fourth valve 262 and/or into and reservoir 40, via the fifth valve 266. The third valve 250 includes a third inlet port 251 and a third outlet port 253. The third inlet port 251 is in selective fluid communication with the external source ES and the third outlet port 253 is in fluid communication with a fourth inlet port, leading to the fourth valve 262, and a fifth inlet port, leading to the fifth valve 266. Therefore, the third outlet port 253 branches into the fourth inlet port and the fifth inlet port 272. The third valve 250 may be a one-way valve that is configured to automatically open under a predefined pressure of air to allow air to flow in one direction through the third valve 250.

The fourth valve 262 is configured for selectively directing air received from the third valve 250 to the interior cavity 34 of the tire 24. The fourth valve 262 may be a controlled check-valve, as already described above with respect to FIGS. 10 and 11. More specifically, the fourth valve 262 includes a fourth inlet port 268 and a fourth outlet port 270. The fourth inlet port 268 is in fluid communication with the third outlet port 253 and the fourth outlet port 270 is in fluid communication with the interior cavity 34 of the tire 24.

The fifth valve 266 is configured to direct air received from the third valve 250 to the reservoir 40. The fifth valve 266 may be configured to allow pressurized air to be provided into the interior cavity 34 of the tire 24 from the external source ES. The fifth valve 266 includes a fifth inlet port 272 and a fifth outlet port 274. The fifth inlet port 272 is in selective fluid communication with the third outlet port 253 and the fifth outlet port 274 is in fluid communication with reservoir 40. The fifth valve 266 may be a one-way valve that is configured to open under a predefined pressure of air to allow air to flow in one direction through the fifth valve 266, while preventing air from escaping from the reservoir 40 via the fifth valves 266.

With continued reference to FIG. 8, the control unit 246 is in operative communication with the first valve 242. The control unit 246 is configured to selectively send a first control signal (arrow $S_{242}$) to the first valve 242 such that the first valve 242 cycles from one of the closed position 84 and the open position 86 to the other one of the closed position 84 and the open position 86. The open position 86 allows air 33 to flow from the reservoir 40 to the interior cavity 34 of the tire 24. Likewise, the closed position 84 prevents air from flowing from the reservoir 40 to the interior cavity 34 of the tire 24.

Similarly, the control unit 246 is configured to selectively send a second control signal (arrow $S_{244}$) to the second valve 244 such that the second valve 244 cycles from the closed position 84 to the open position 86 to allow air to flow from the interior cavity 34 of the tire 24 to atmosphere ATM. Likewise, the control unit 246 is configured to selectively send another second control signal (arrow $S_{244}$) to the second valve 244 such that the second valve 244 cycles from the open position 86 to the closed position 84 to prevent air from flowing from the interior cavity 34 of the tire 24 to atmosphere ATM.

With continued reference to FIG. 8, the control unit 246 is configured to selectively send a third control signal (arrow $S_{262}$) to the fourth valve 262 such that the fourth valve 262 cycles from the closed position 84 to the open position 86 to allow pressurized air to flow from the third outlet port 253 (via the third valve 250) and into the interior cavity 34 of the tire 24. Likewise, the control unit 26 is configured to selectively send another third control signal (arrow $S_{262}$) to the fourth valve 262 such that the fourth valve 262 cycles from the open position 86 to the closed position 84 to prevent air from flowing from the third outlet port 253 and into the interior cavity 34 of the tire 24.

The energy storage device 48 may be in operative communication with the control unit 246. The energy storage device 48 is configured to provide electrical current (at arrow C1) to the control unit 246.

A first pressure gauge 52 may be in operative communication with the reservoir 40. The first pressure gauge 52 may be configured to monitor the pressure and the temperature of the air within the reservoir 40. The monitored pressure and temperature of air within the reservoir 40 may be transmitted from the first pressure gauge 52 to the control unit 246 (at arrow $S_{52}$). The first gauge 52 may transmit the pressure and temperature wirelessly. However, it should be appreciated that the monitored pressure and temperature of air may also be transmitted via a wired transmission.

A second pressure gauge 54 may be in operative communication with the interior cavity 34 of the tire 24. The second pressure gauge 54 may be configured to monitor the pressure and the temperature of air within the interior cavity 34 of the tire 24. The monitored pressure and temperature of air within the interior cavity 34 of the tire 24 may be transmitted from the second pressure gauge 54 to the control unit 246 (arrow $S_{52}$). The second pressure gauge 54 may transmit the signal wirelessly (arrow $S_{54}$). However, it should be appreciated that the monitored pressure and temperature of air may also be transmitted via a wired transmission.

Referring again to FIGS. 1 and 8, if the vehicle controller 23 determines that the pressure within the reservoir 40 is too low, the vehicle controller 23 may transmit a message M to alert an operator of the vehicle 20 that the pressure within the reservoir 40 is too low. As such, the operator may fill the reservoir via a combination of the third valve 250 and the fifth valves 266. Alternatively, if the vehicle controller 23 determines the pressure within the reservoir 40 is too low, the vehicle controller 23 may transmit a signal (arrow $S_{264}$) to an air pump 264 to, in turn, fill the reservoir 40 with pressurized air. If the vehicle controller 23 determines that the pressure within the interior cavity 34 of the tire 24 is too low, vehicle controller 23 may transmit a message M to alert the operator of vehicle 20 that the pressure within the interior cavity 34 of the tire 24 is too low. As such, the operator may fill the interior cavity 34 of the tire 24 via a combination of the third valve 250 in the fourth valve 262. However, the operator may only be allowed to fill the interior cavity 34 of the tire 24 if the control unit 246 has transmitted a third control signal (arrow $S_{262}$) to the fourth valve 262 to cycle the fourth valve 262 to the open position 86. Therefore, air 33 is only allowed to enter the interior cavity 34 of the tire 24, via the third valve 250, when the fourth valve 262 is in the open position 86.

Additionally, if the vehicle controller 23 determines the pressure within the interior cavity 34 of the tire 24 is too low, the vehicle controller 23 may transmit a signal (arrow $S_{23}$) to the control unit 246 of the respective pressure system 28. In response to receiving the signal (arrow $S_{23}$), the control unit 246 is configured to transmit a first control signal (arrow $S_{42}$) to cycle the first valve 242 from the closed position 84 to the open position 86 until pressure within the interior cavity 34 of the tire 24 achieves a desired pressure. As such, once a desired pressure is achieved, the control unit 246 transmits another first control signal $S_{142}$ to cycle the first valve 242 from the open position 86 to the closed position 84.

Further, if the vehicle controller 23 determines the pressure within the interior cavity 34 of the tire 24 is too high, the control unit 246 may transmit seventh second control signal (arrow $S_{244}$) to cycle the second valve 244 from the closed position 84 to the open position 86 until the pressure within the interior cavity 34 of the tire 24 is at an acceptable pressure. By way of a non-limiting example, an operator of a vehicle may select a driving mode that may require less pressure within the tires 24. In this example, the signal (arrow $S_{23}$) transmitted from the vehicle controller 23 to the control units 246 may correspond to a required tire pressure. Accordingly, when another driving mode is selected that requires a higher tire pressure, the first valve 242 may be actuated to supply a desired amount of tire pressure to the interior cavity 34 of the tire 24.

Referring to FIGS. 4A, 4B, 6, 8, the reservoir may also include a pressure valve 65. The pressure valve 65 may be configured as a one-way check-valve configured to open to release air from within the reservoir 40 to atmosphere ATM in the event the pressure within the reservoir exceeds a predefined pressure. Therefore, the pressure valve 65 is configured to prevent the reservoir 40 from being filled beyond a predefined pressure. During the fill process, in the event the reservoir 40 is filled beyond the predefined pressure, air may escape to atmosphere ATM and emit a sound, which may be audible to the operator filling the tire assembly 22.

Referring to FIG. 12-16, the pressure system 28 may also include a pulsed charger 96 in operative communication with the energy storage device 48. The pulsed charger 96 is configured to energize the energy storage device 48 using a regenerative power method. More specifically, the pulsed charger 96 utilizes the electromagnetic induction effect of a pair of magnets 98A, 98B having an opposed magnetic field orientation over a pair of coils 100A, 100B. Alternatively, the magnets 98A, 98B may be electro-magnets, which are activated using electric power from the vehicle 20 when the energy storage device 48 within the pressure module 35 needs to be recharged.

Figure 16:
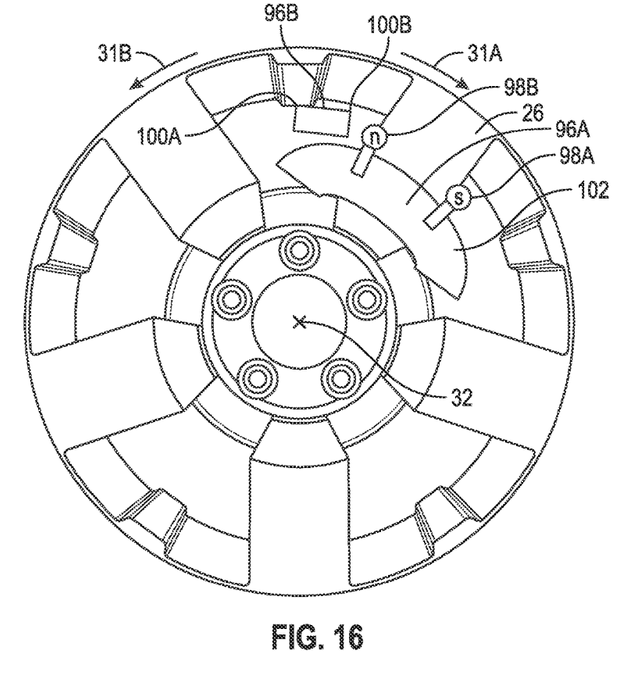
FIG. 16 is a schematic side view of a pulse charger having a first charging module attached to a wheel and a second charging module attached to a brake caliper of the vehicle.

With reference to FIGS. 12-16, the pulse charger 96 may include a first charging module 96A and a second charging module 96B in operative communication with the first charging module 96A. The first charging module 96A includes a plurality of magnets 98A, 98B operatively attached to a stationary object of the vehicle 20. By way of a non-limiting example, FIG. 16 illustrates that the stationary object is a brake caliper 102. The plurality of magnets may include a first magnet 98A and a second magnet 98B. However, it should be appreciated that the first charging module 96A may include any desired number of magnets.

Figure 3:
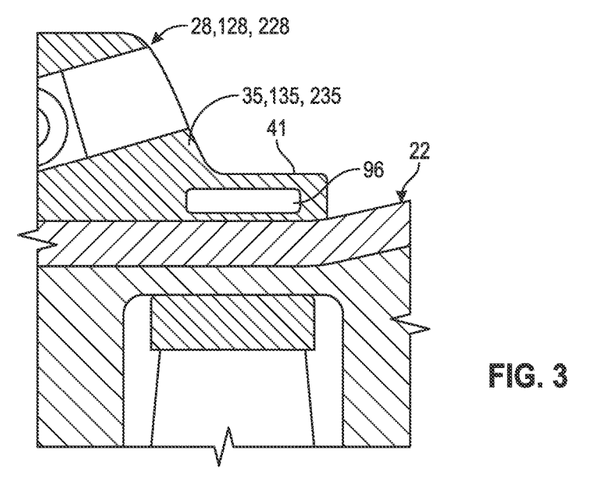
FIG. 3 is a cross-section of a pressure system of FIG. 2, taken along line 3-3.

The second charging module 96B includes a plurality of coils 100A, 100B and a voltage regulation unit 104. The plurality of coils 100A, 100B may include a first coil 100A and a second coil 100B. As illustrated in FIG. 3, the second charging module 96B is embedded within the housing 41 of the pressure module 35. While FIG. 3 illustrates a cross-section of the pressure module 35, 135, 235 of FIG. 2. For purposes of illustrative simplicity, the pressure module, as relating to the pulse charger 96, will be described in the context of pressure module 35.

With reference to FIGS. 2 and 16, the pressure module 35 is operatively attached to the wheel 26 of the tire assembly 22 such that the first and second coils 100A, 100B rotate, as part of the pressure module 35, past the respective magnets 98A, 98B as the tire assembly 22 rotates relative to the brake caliper 102. Referring now to FIGS. 12-15, the second charging module 96B rotates with the wheel 26, relative to the first and second magnets 96A, 96B. As the coils 100A, 100b pass by the respective first and second magnets 96A, 96B, an electromagnetic induction of the sets of magnets 96A, 96B over the set of coils 100A 100B is created by virtue of pulsing electric energy of the being created. This electric energy is transferred to the energy storage device 48 of FIGS. 4A-9, via the voltage regulation unit 104. It should be appreciated that the numbers of magnets is not limited to a single pair, as there might be any even number of evenly spaced magnets disposed on the wheel 26. It should also be appreciated that the pulsed charger 96 is not limited to charging an energy storage device of the pressure system 28, as the pulsed charger 96 may be used to provide electrical current to energize other devices within the vehicle 20.

Additionally, in another embodiment, the magnets 98A, 98B may be configured to move between a retracted position and an extended position, in response to receiving a charging signal from the control unit 46. In this embodiment, in the absence of a charging signal, the magnets 98A, 98B are refracted so as to not create a magnetic field when the coils 100A, 100B are rotated. However, if a determination is made that the energy storage device 48 requires charging, the control unit $.46 of the charging signal so as to move the magnets 98A, 98B to the extended position, such that the magnetic field may be generated.

In another non-limiting example, the first charging module 96A may be operatively attached to the wheel 26 and the second charging module 96B is operatively attached to the stationary object of the vehicle 20. In this embodiment, the first charging module 96A would include magnets. Power generated from this embodiment may be used to power other components of the vehicle 20, including, but not limited to, sensors transmitters, and the like.

While the best modes for carrying out the many aspects of the present teachings have been described in detail, those familiar with the art to which these teachings relate will recognize various alternative aspects for practicing the present teachings that are within the scope of the appended claims

The invention claimed is:

1. A pressure module for a tire assembly having a reservoir and a tire defining an interior cavity, the pressure module comprising:
    a housing;
    a first valve configured to selectively direct air from the reservoir to the interior cavity of the tire;
    a second valve configured to direct air from the interior cavity of the tire to the atmosphere;
    a control unit in operative communication with the first valve; and
    an energy storage device in electrical communication with the control unit;
    wherein the energy storage device is configured to supply energy to the control unit;
    wherein the control unit is configured to selectively send a first control signal to the first valve such that the first valve cycles from a first position, at which air is prevented from flowing from the reservoir to the interior cavity, to a second position, at which air is allowed to flow from the reservoir to the interior cavity of the tire;
    wherein the control unit is configured to selectively send another first control signal to the first valve such that the first valve cycles from the second position to the first position;
    wherein the first control signal is an electrical current supplied by the control unit; and
    wherein the first valve, the second valve, the control unit, and the energy storage device are operatively disposed within the housing.

2. The pressure module, as set forth in claim 1, wherein the second valve is configured to automatically cycle from a first position, at which air is prevented from flowing from the interior cavity of the tire to atmosphere, to a second position, at which air is allowed to flow from the interior cavity of the tire to atmosphere, in response to a pressure within the interior cavity of the tire exceeding a predefined pressure.

3. The pressure module, as set forth in claim 1, wherein the control unit is in selective communication with the second valve;
    wherein the control unit is configured to selectively send a second control signal to the second valve such that the second valve cycles from a first position, at which air is prevented from flowing from the interior cavity of the tire to atmosphere, to a second position, at which air is allowed to flow from the interior cavity of the tire to atmosphere; and
    wherein the control unit is configured to selectively send another second control signal to the second valve such that the second valve cycles from the second position to the first position to prevent air from flowing from the interior cavity of the tire to atmosphere.

4. The pressure module, as set forth in claim 1, further comprising a third valve configured to be operatively disposed between an external source and one of the reservoir and the interior cavity of the tire;
    wherein the third valve is configured to direct air from the external source to the one of the reservoir and the interior cavity of the tire.

5. The pressure module, as set forth in claim 4, further comprising a fourth valve configured to be operatively disposed between the third valve and the interior cavity of the tire;
    wherein the control unit is in operative communication with the fourth valve;
    wherein the control unit is configured to selectively send a third control signal to the fourth valve such that the fourth valve cycles from a first position, at which air is prevented from flowing from the third valve to the interior cavity of the tire, to a second position, at which air is allowed to flow from the third valve to the interior cavity of the tire; and
    wherein the control unit is configured to selectively send a third control signal to the fourth valve such that the fourth valve cycles from the second position to the first position to prevent air from flowing from the third valve to the interior cavity of the tire.

6. The pressure module, as set forth in claim 4, further comprising a fifth valve configured to be disposed between the third valve and the reservoir;
    wherein the fifth valve is configured to direct air from the external source to one of the reservoir and the interior cavity of the tire.

7. A tire assembly for a vehicle, the tire assembly comprising:
    a reservoir configured for holding pressurized air therein;

a tire defining an interior cavity configured for holding pressurized air therein; and a pressure module in selective fluid communication with each of the reservoir and the tire, the pressure module including:

a housing;

a first valve configured to selectively direct air from the reservoir to the interior cavity of the tire;

a second valve configured to direct air from the interior cavity of the tire to the atmosphere;

a control unit in operative communication with the first valve; and an energy storage device in electrical communication with the control unit;

wherein the energy storage device is configured to supply energy to the control unit;

wherein the control unit is configured to selectively send a first control signal to the first valve such that the first valve cycles from a first position, at which air is prevented from flowing from the reservoir to the interior cavity, to a second position, at which air is allowed to flow from the reservoir to the interior cavity of the tire;

wherein the control unit is configured to selectively send another first control signal to the first valve such that the first valve cycles from the second position to the first position;

wherein the first control signal is an electrical current supplied by the control unit; and wherein the first valve, the second valve, the control unit, and the energy storage device are operatively disposed within the housing.

8. The tire assembly, as set forth in claim 7, wherein the second valve is configured to automatically cycle from a first position, at which air is prevented from flowing from the interior cavity of the tire to atmosphere, to a second position, at which air is allowed to flow from the interior cavity of the tire to atmosphere, in response to a pressure within the interior cavity of the tire exceeding a predefined pressure.

9. The tire assembly, as set forth in claim 7, wherein the control unit is in selective communication with the second valve;

wherein the control unit is configured to selectively send a second control signal to the second valve such that the second valve cycles from a first position, at which air is prevented from flowing from the interior cavity of the tire to atmosphere, to a second position, at which air is allowed to flow from the interior cavity of the tire to atmosphere; and wherein the control unit is configured to selectively send another second control signal to the second valve such that the second valve cycles from the second position to the first position to prevent air from flowing from the interior cavity of the tire to atmosphere.

10. The tire assembly, as set forth in claim 7, further comprising a third valve operatively disposed between an external source and one of the reservoir and the interior cavity of the tire;

wherein the third valve is configured to direct air from the external source to the one of the reservoir and the interior cavity of the tire.

11. The tire assembly, as set forth in claim 10, further comprising a fourth valve operatively disposed between the third valve and the interior cavity of the tire;

wherein the control unit is in operative communication with the fourth valve;

wherein the control unit is configured to selectively send a third control signal to the fourth valve such that the fourth valve cycles from a first position, at which air is prevented from flowing from the third valve to the interior cavity of the tire, to a second position, at which air is allowed to flow from the third valve to the interior cavity of the tire; and wherein the control unit is configured to selectively send a third control signal to the fourth valve such that the fourth valve cycles from the second position to the first position to prevent air from flowing from the third valve to the interior cavity of the tire.

12. The tire assembly, as set forth in claim 10, further comprising a fifth valve disposed between the third valve and the reservoir;

wherein the fifth valve is configured to direct air from the external source to one of the reservoir and the interior cavity of the tire.

13. A vehicle comprising:

a vehicle controller; and a tire assembly in operative communication with the vehicle controller, the tire assembly including:

a reservoir configured for holding pressurized air therein;

a tire defining an interior cavity configured for holding pressurized air therein; and a pressure module in selective fluid communication with each of the reservoir and the tire, the pressure module having:

a housing;

a first valve configured to selectively direct air from the reservoir to the interior cavity of the tire;

a second valve configured to direct air from the interior cavity of the tire to the atmosphere; and a control unit in operative communication with the vehicle controller and the first valve; and an energy storage device in electrical communication with the control unit;

wherein the energy storage device is configured to supply energy to the control unit:

wherein the control unit is configured to selectively send a first control signal to the first valve such that the first valve cycles from a first position, at which air is prevented from flowing from the reservoir to the interior cavity, to a second position, at which air is allowed to flow from the reservoir to the interior cavity of the tire; and wherein the control unit is configured to selectively send another first control signal to the first valve such that the first valve cycles from the second position to the first position;

wherein the first control signal is an electrical current supplied by the control unit; and wherein the first valve, the second valve, the control unit, and the energy storage device are operatively disposed within the housing.

14. The vehicle, as set forth in claim 13, further comprising:

a pulsed charger in operative communication with the energy storage device;

wherein the pulsed charger includes a first magnet, a second magnet, a first coil, and a second coil;

wherein the first and second coils are operatively connected to the energy storage device; and wherein the first and second magnets are configured to move sequentially past the respective first and second coils such that a magnet field is generated so as to induce a current to be supplied to the energy storage device.

15. The vehicle, as set forth in claim 13, wherein the second valve is configured to automatically cycle from a first position, at which air is prevented from flowing from the interior cavity of the tire to atmosphere, to a second position, at which air is allowed to flow from the interior cavity of the tire to atmosphere, in response to a pressure within the interior cavity of the tire exceeding a predefined pressure.

16. The vehicle, as set forth in claim 13, wherein the control unit is in selective communication with the second valve;
  wherein the control unit is configured to selectively send a second control signal to the second valve such that the second valve cycles from a first position, at which air is prevented from flowing from the interior cavity of the tire to atmosphere, to a second position, at which air is allowed to flow from the interior cavity of the tire to atmosphere; and
  wherein the control unit is configured to selectively send another second control signal to the second valve such that the second valve cycles from the second position to the first position to prevent air from flowing from the interior cavity of the tire to atmosphere.

17. The vehicle, as set forth in claim 13, further comprising a third valve operatively disposed between an external source and one of the reservoir and the interior cavity of the tire;
  wherein the third valve is configured to direct air from the external source to the one of the reservoir and the interior cavity of the tire.

18. The vehicle, as set forth in claim 17, further comprising a fourth valve operatively disposed between the third valve and the interior cavity of the tire;
  wherein the control unit is in operative communication with the fourth valve;
  wherein the control unit is configured to selectively send a third control signal to the fourth valve such that the fourth valve cycles from a first position, at which air is prevented from flowing from the third valve to the interior cavity of the tire, to a second position, at which air is allowed to flow from the third valve to the interior cavity of the tire; and
  wherein the control unit is configured to selectively send a third control signal to the fourth valve such that the fourth valve cycles from the second position to the first position to prevent air from flowing from the third valve to the interior cavity of the tire; and
  a fifth valve operatively disposed between the third valve and the reservoir;
  wherein the fifth valve is configured to direct air from the external source to one of the reservoir and the interior cavity of the tire.

* * * * *